US009460401B2

(12) United States Patent
Zeng et al.

(10) Patent No.: US 9,460,401 B2
(45) Date of Patent: Oct. 4, 2016

(54) USING MACHINE LEARNING TO PREDICT BEHAVIOR BASED ON LOCAL CONDITIONS

(71) Applicant: INSIDESALES.COM, INC., Provo, UT (US)

(72) Inventors: Xinchuan Zeng, Orem, UT (US); Jeffrey Berry, South Jordan, UT (US); David Elkington, Mapleton, UT (US)

(73) Assignee: INSIDESALES.COM, INC., Provo, UT (US)

( * ) Notice: Subject to any disclaimer, the term of this patent is extended or adjusted under 35 U.S.C. 154(b) by 0 days.

(21) Appl. No.: 14/530,248

(22) Filed: Oct. 31, 2014

(65) Prior Publication Data
US 2015/0278709 A1     Oct. 1, 2015

Related U.S. Application Data

(63) Continuation-in-part of application No. PCT/US2013/055856, filed on Aug. 20, 2013, which is a continuation of application No. 13/590,000, filed on Aug. 20, 2012, now Pat. No. 8,812,417.

(60) Provisional application No. 61/969,828, filed on Mar. 25, 2014.

(51) Int. Cl.
*G06N 99/00* (2010.01)
*G06N 3/08* (2006.01)

(52) U.S. Cl.
CPC ............ *G06N 99/005* (2013.01); *G06N 3/084* (2013.01)

(58) Field of Classification Search
None
See application file for complete search history.

(56) References Cited

U.S. PATENT DOCUMENTS

| 6,353,814 | B1 | 3/2002 | Weng |
| 6,581,048 | B1 | 6/2003 | Webos |
| 7,152,051 | B1 | 12/2006 | Commons et al. |
| 8,185,486 | B2 | 5/2012 | Eder |
| 8,285,667 | B2 | 10/2012 | Jaros et al. |
| 8,352,389 | B1 | 1/2013 | Martinez et al. |
| 8,788,439 | B2 | 7/2014 | Martinez et al. |
| 8,812,417 | B2 | 8/2014 | Martinez et al. |
| 2003/0140023 | A1 | 7/2003 | Ferguson et al. |
| 2005/0060313 | A1 | 3/2005 | Naimat et al. |
| 2005/0265607 | A1 | 12/2005 | Chang |
| 2007/0005539 | A1 | 1/2007 | Bergman et al. |
| 2007/0174105 | A1 | 7/2007 | Abe et al. |
| 2008/0249844 | A1 | 10/2008 | Abe et al. |
| 2008/0288292 | A1 | 11/2008 | Bi et al. |

(Continued)

OTHER PUBLICATIONS

International Search Report and Written Opinion mailed Jun. 22, 2015 in related PCT Application No. PCT/US2015/021740, 10 pgs.

(Continued)

*Primary Examiner* — Kakali Chaki
*Assistant Examiner* — Daniel Pellett
(74) *Attorney, Agent, or Firm* — Maschoff Brennan

(57) ABSTRACT

Using machine learning to predict behavior based on local conditions. In one example embodiment, a method for using machine learning to predict behavior based on local conditions may include identifying a lead, identifying a target behavior for the lead, identifying a locality associated with the lead, identifying a current local condition of the locality, and employing a machine learning classifier to generate a prediction of a likelihood of the lead exhibiting the target behavior. In this example embodiment, the machine learning classifier may base the prediction on the target behavior, the locality, and the current local condition.

19 Claims, 5 Drawing Sheets

(56) References Cited

U.S. PATENT DOCUMENTS

| | | |
|---|---|---|
| 2008/0306830 A1 | 12/2008 | Lasa et al. |
| 2009/0092312 A1 | 4/2009 | Kasahara et al. |
| 2009/0157571 A1 | 6/2009 | Smith et al. |
| 2009/0176580 A1 | 7/2009 | Herrmann et al. |
| 2010/0145678 A1 | 6/2010 | Csomai et al. |
| 2010/0280827 A1 | 11/2010 | Mukerjee et al. |
| 2011/0046970 A1 | 2/2011 | Fontenot |
| 2011/0099130 A1 | 4/2011 | Blumberg et al. |
| 2011/0106735 A1 | 5/2011 | Weston et al. |
| 2011/0106743 A1 | 5/2011 | Duchon |
| 2011/0119213 A1 | 5/2011 | Elisseeff et al. |
| 2011/0153419 A1 | 6/2011 | Hall |
| 2011/0196924 A1 | 8/2011 | Hargarten et al. |
| 2011/0213741 A1 | 9/2011 | Shama et al. |
| 2011/0270779 A1 | 11/2011 | Showalter |
| 2011/0301447 A1 | 12/2011 | Park et al. |
| 2012/0041727 A1 | 2/2012 | Mishra et al. |
| 2012/0203720 A1 | 8/2012 | Baker |
| 2013/0138577 A1 | 5/2013 | Sisk |
| 2014/0052678 A1* | 2/2014 | Martinez et al. ............... 706/21 |
| 2014/0180975 A1 | 6/2014 | Martinez et al. |
| 2014/0180978 A1 | 6/2014 | Martinez et al. |
| 2015/0161507 A1 | 6/2015 | Martinez et al. |
| 2015/0161508 A1 | 6/2015 | Martinez et al. |

OTHER PUBLICATIONS

Leclercq et al. "Autonomous learning algorithm or fully connected recurrent networks", ESANN, 2003, pp. 379-384.
Bilmes et al., "Generalized ruled for combination and joint training of classifiers", PAA 2003, pp. 201-211.
Friedman, et al., "An algorithm for finding nearest neighbors", IEEE Transactions on Computers, C-24, 10, 1000-1006 (1975).
Kaelbling, et al., "Reinforcement Learning: A Survey", Journal of Artificial Intelligence Research 4: 237-285 (1996).
Quinlan, J.R., "Improved use of continuous attributes in c4.5", Journal of Artificial Intelligence Research, 4:77-90 (1996).
Smith, et al., "Improving Classification Accuracy by Identifying and Removing Instances that Should Be Misclassified", Proceedings of IJCNN-2011 (International Joint Conference on Neural Networks), pp. 2690-2697 (2011).
Sutton, Richard S., "Learning to Predict by the Methods of Temporal Differences", Machine Learning (Springer) 3: 9-44 (1988).
Cover, et al., "Nearest Neighbor Pattern Classification", IEEE Transactions on Information Theory 13 (1): 21-27 (1967).
Quinlan, J. R (1986). Induction of Decision Trees. Machine Learning 1, 1 (Mar. 1986), 81-106.
Seok-Beom Roh et al., "A fussy ensemble of parallel polynomial neural networks with information granules formed by fuzzy clustering" in Knowledge Based Systems vol. 23 pp. 202-219 (2010).
International Search Report and Written Opinion dated Feb. 28, 2014 in related PCT Application No. PCT/US13/55856.
International Search Report and Written Opinion dated Mar. 6, 2014 in related PCT Application No. PCT/US2013/055859.
International Search Report and Written Opinion dated Apr. 14, 2014 in related PCT Application No. PCT/US2013/077260.
U.S. Appl. No. 13/590,000, filed Nov. 23, 2012, Office Action.
U.S. Appl. No. 13/590,000, filed Feb. 15, 2013, Amendment and Response.
U.S. Appl. No. 13/590,000, filed May 22, 2013, Office Action.
U.S. Appl. No. 13/590,000, filed Aug. 5, 2013, Amendment and Response.
U.S. Appl. No. 13/590,000, filed Oct. 28, 2013, Notice of Allowance.
U.S. Appl. No. 13/590,000, filed Mar. 27, 2014, Notice of Allowance.
U.S. Appl. No. 13/590,000, filed May 22, 2014, Notice of Allowance.
U.S. Appl. No. 13/590,028, filed Nov. 9, 2012, Notice of Allowance.
U.S. Appl. No. 13/590,028, filed Dec. 13, 2012, Notice of Allowance.
U.S. Appl. No. 13/725,653, filed Apr. 11, 2013, Office Action.
U.S. Appl. No. 13/725,653, filed Jul. 10, 2013, Amendment and Response.
U.S. Appl. No. 13/725,653, filed Nov. 22, 2013, Notice of Allowance.
U.S. Appl. No. 13/725,653, filed Mar. 24, 2014, Notice of Allowance.
U.S. Appl. No. 13/725,653, filed May 7, 2014, Notice of Allowance.

* cited by examiner

USING MACHINE LEARNING TO PREDICT BEHAVIOR BASED ON LOCAL CONDITIONS

CROSS-REFERENCE TO A RELATED APPLICATION

This application claims the benefit of and priority to U.S. Provisional Application No. 61/969,828, filed Mar. 25, 2014, titled "PREDICTING BEHAVIOR BASED ON LOCAL CONDITIONS," which is incorporated herein by reference in its entirety.

FIELD

The embodiments discussed herein are related to using machine learning to predict behavior based on local conditions.

BACKGROUND

Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

One application for machine learning is lead response management (LRM). LRM is the process of responding to leads in a manner that optimizes a target behavior in the lead, such as a qualification or a sale. Leads may come from a variety of sources such as a list purchased from a lead vendor. When lead information comes into an organization, the output decision of how to respond to the lead may include multiple interdependent components such as, but not limited to, who should respond to the lead, what method should be employed to respond to the lead, what content should be included in the response message, and when should the response take place. Each of these components of the output decision depends on both the input (such as the lead information) and the other components. For example, the timing of the response may depend on the availability of the person selected to respond. Also, the content of the message may depend on the method of response (e.g., since the length of an email message is not limited like the length of a text message).

One main difficulty using machine learning in LRM involves identifying appropriate inputs for use in the machine learning that will result in accurate suggestions of how to respond to leads in a manner that optimizes a target behavior. For example, a number of different relevant variables may come into play that may affect the probability of a particular lead exhibiting a target behavior, such as being qualified or making a purchase, but identifying these relevant variables can be difficult. Failing to identify relevant variables can decrease the effectiveness of LRM decisions arrived at using machine learning.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to using machine learning to predict behavior based on local conditions. The example methods disclosed herein may be employed to identify a lead, a target behavior for the lead, a locality associated with the lead, and a current local condition of the locality. A machine learning classifier may then be employed to generate a prediction of a likelihood of the lead exhibiting the target behavior based on the target behavior, the locality, and the current local condition. In this manner, machine learning can factor in local conditions in a locality associated with a lead, such as the current weather conditions, in order to optimize a target behavior for the lead, such as the lead responding to a contact attempted by an agent, the lead accepting an appointment with the agent, the lead purchasing a product or service from the agent, or the lead donating money to the agent, or some combination thereof.

In one example embodiment, a method for using machine learning to predict behavior based on local conditions may include identifying a lead, identifying a target behavior for the lead, identifying a locality associated with the lead, identifying a current local condition of the locality, and employing a machine learning classifier to generate a prediction of a likelihood of the lead exhibiting the target behavior. In this example embodiment, the machine learning classifier may base the prediction on the target behavior, the locality, and the current local condition.

In another example embodiment, a method for using machine learning to predict behavior based on local conditions may include training a machine learning classifier to predict likelihoods of leads exhibiting target behaviors, identifying a lead, identifying a target behavior for the lead, identifying a locality associated with the lead, identifying a current local condition of the locality, and employing the machine learning classifier to generate a prediction of a likelihood of the lead exhibiting the target behavior. In this example embodiment, the training may employ historical locality information of one or more localities, historical local condition information for the one or more localities, and historical lead contact information for the one or more localities. Also, in this example embodiment, the machine learning classifier may base the prediction on the target behavior, the locality, and the current local condition.

In yet another example embodiment, a method for using machine learning to predict behavior based on local conditions may include training a machine learning classifier to predict likelihoods of leads exhibiting target behaviors, identifying a lead, identifying one or more characteristics of the lead, identifying multiple contact methods available to an agent to contact the lead, identifying a target behavior for the lead, identifying a locality associated with the lead, identifying one or more current local conditions of the locality, and employing the machine learning classifier to generate a prediction of a likelihood of the lead exhibiting the target behavior for each of the multiple contact methods available to the agent to contact the lead. In this example embodiment, the machine learning classifier may be a multilayer perceptron (MLP) neural network, another multilayer neural network, a decision tree, or a support vector machine. Also, in this example embodiment, the training may employ historical locality information of one or more localities, historical local condition information for the one or more localities, and historical lead contact information for the one or more localities. Further, in this example embodiment, the target behavior for the lead may include the lead responding to a contact attempted by the agent, the lead accepting an appointment with the agent, the lead purchasing a product or service from the agent, or the lead donating money to the agent, or some combination thereof. Also, in this example embodiment, the machine learning classifier may base the predictions on the one or more characteristics of the lead, the target behavior, the locality, the one or more current local conditions, and the multiple contact methods.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
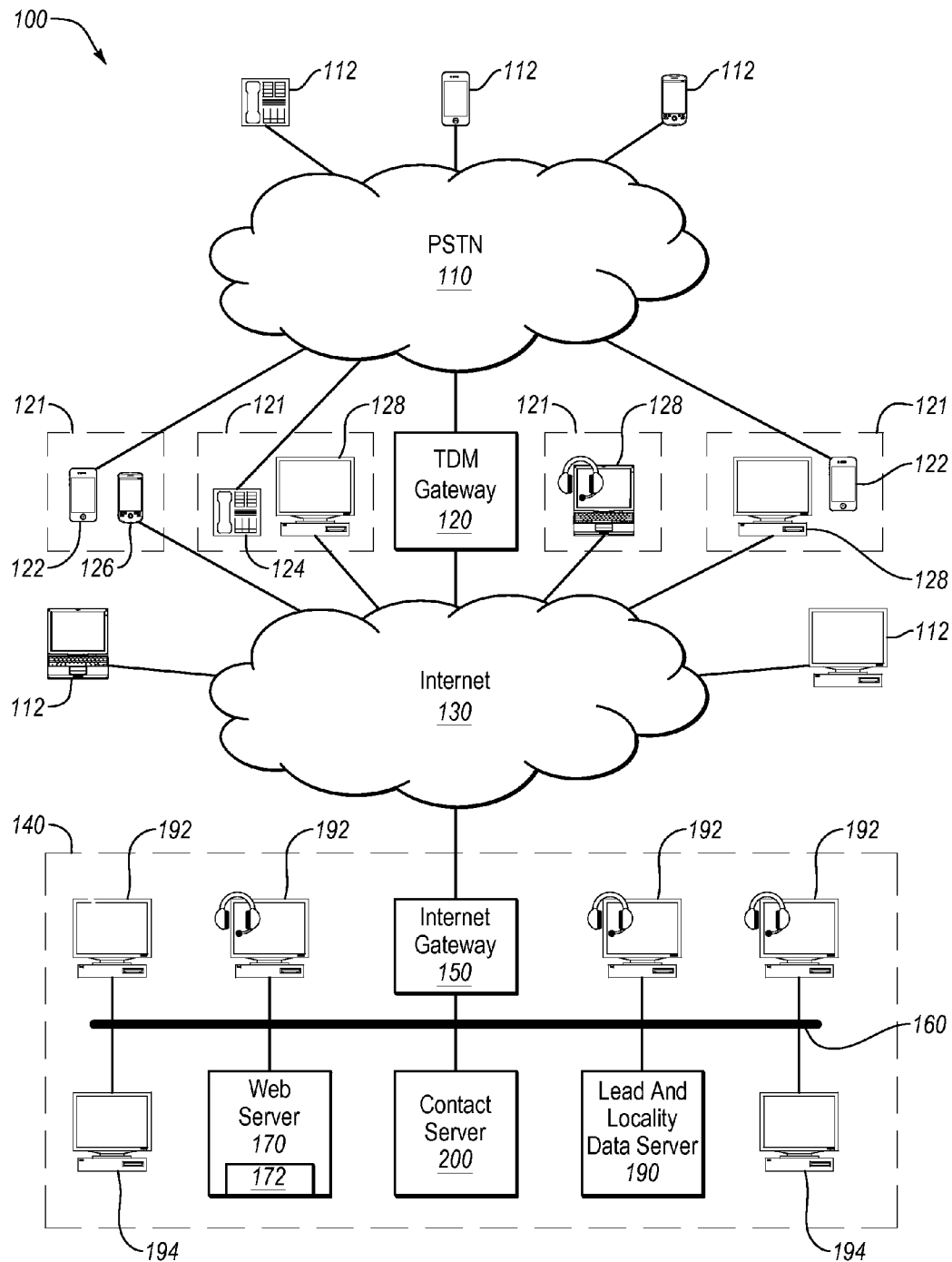
FIG. 1 is a schematic block diagram illustrating an example lead response management (LRM) system including an example contact server.

FIG. 1 is a schematic block diagram illustrating an example LRM system 100. As depicted, the example LRM system 100 includes various components such as a public switched telephone network (PSTN) 110, user communication and/or computing devices 112, a TDM gateway 120 connecting the PSTN 110 to an internet 130, remote agent stations 121, workstations 128, a call center 140, an internet gateway 150 connecting a local area network 160 to the internet 130, a web server 170, a contact server 200, a lead and locality data server 190, local agent workstations 192, and control workstations 194. The various components of the example LRM system 100 operably interconnected to collaboratively improve a process of responding to leads in a manner that optimizes a target behavior.

As disclosed in FIG. 1, the remote agent stations 121 include wireless phones 122, wired phones 124, wireless computing devices 126, and the workstations 128. In certain embodiments, the wireless phones 122 or the wired phones 124 may be voice over internet protocol (VoIP) phones. In some embodiments, the wireless computing devices 126 or the workstations 128 may be equipped with a soft phone. The remote agent stations 121 enable agents to respond to leads from remote locations similar to agents stationed at the local agent workstations 192 and directly connected to the local area network 160.

In one example embodiment, the local area network 160 resides within the call center 140 that uses VoIP and other messaging services to contact users connected to the PSTN 110 and/or the internet 130. The various servers in the call center 140 function cooperatively to acquire leads, store lead information, analyze lead information to decide how best to respond to each lead, distribute leads to agents via agent terminals such as the local agent workstations 192 and the remote agent stations 121 for example, facilitate communication between agents and leads via the PSTN 110 or the internet 130 for example, track attempted and successful agent interaction with leads, and store updated lead information.

The web server 170 may provide one or more web forms 172 to users via browser-displayable web pages. The web forms may be displayed to the users via a variety of user communication and/or computing devices 112 including phones, smartphones, tablet computers, laptop computers, desktop computers, media players, and the like that are equipped with a browser. The web forms 172 may prompt the user for contact data such as name, title, industry, company information, address, phone number, fax number, email address, instant messaging address, referral information, availability information, and interest information. The web server 170 may receive the lead information associated with the user in response to the user submitting the web form and provide the lead information to the contact server 200 and the lead and locality data server 190, for example.

The contact server 200 and the lead and locality data server 190 may receive the lead information and retrieve additional data associated with the associated user such as web analytics data, reverse lookup data, credit check data, web site data, web site rank information, do-not-call registry data, data from a customer relationship management (CRM) database, and background check information. The lead and locality data server 190 may store the collected data in a lead profile (not shown) and associate the user with an LRM plan (not shown).

The lead and locality data server 190 may further receive and store locality data for localities associated with the leads stored in the lead and locality data server 190, as well as other localities for which future leads may be associated. For example, this locality data may include, for each locality, historical locality information of the locality, historical local condition information for the locality, and historical lead contact information for the locality.

The contact server 200 and the lead and locality data server 190 may receive the lead information and retrieve additional data associated with the associated user such as web analytics data, reverse lookup data, credit check data, web site data, web site rank information, do-not-call registry data, data from a customer relationship management (CRM) database, and background check information. The lead and locality data server 190 may store the collected data in a lead profile (not shown) and associate the user with an LRM plan (not shown).

The contact server 200 may contact a lead in accordance with an associated LRM plan and deliver lead information to an agent to enable the agent to respond to the lead in a manner that optimizes a target behavior. The particular purpose of the agent responding to the lead may include, but is not limited to, establishing a relationship with the lead, thanking the lead for their interest in a product, answering questions from the lead, informing the lead of a product or service offering, selling a product or service, surveying the lead on their needs and preferences, and providing support to the lead. The contact server 200 may deliver the information to the agent using a variety of delivery services such as email services, instant messaging services, short message services, enhanced messaging services, text messaging services, telephony-based text-to-speech services, and multimedia delivery services. Agent terminals 121 or 192 may present the lead information to the agent and enable the agent to respond to the lead by communicating with the lead.

Figure 2:
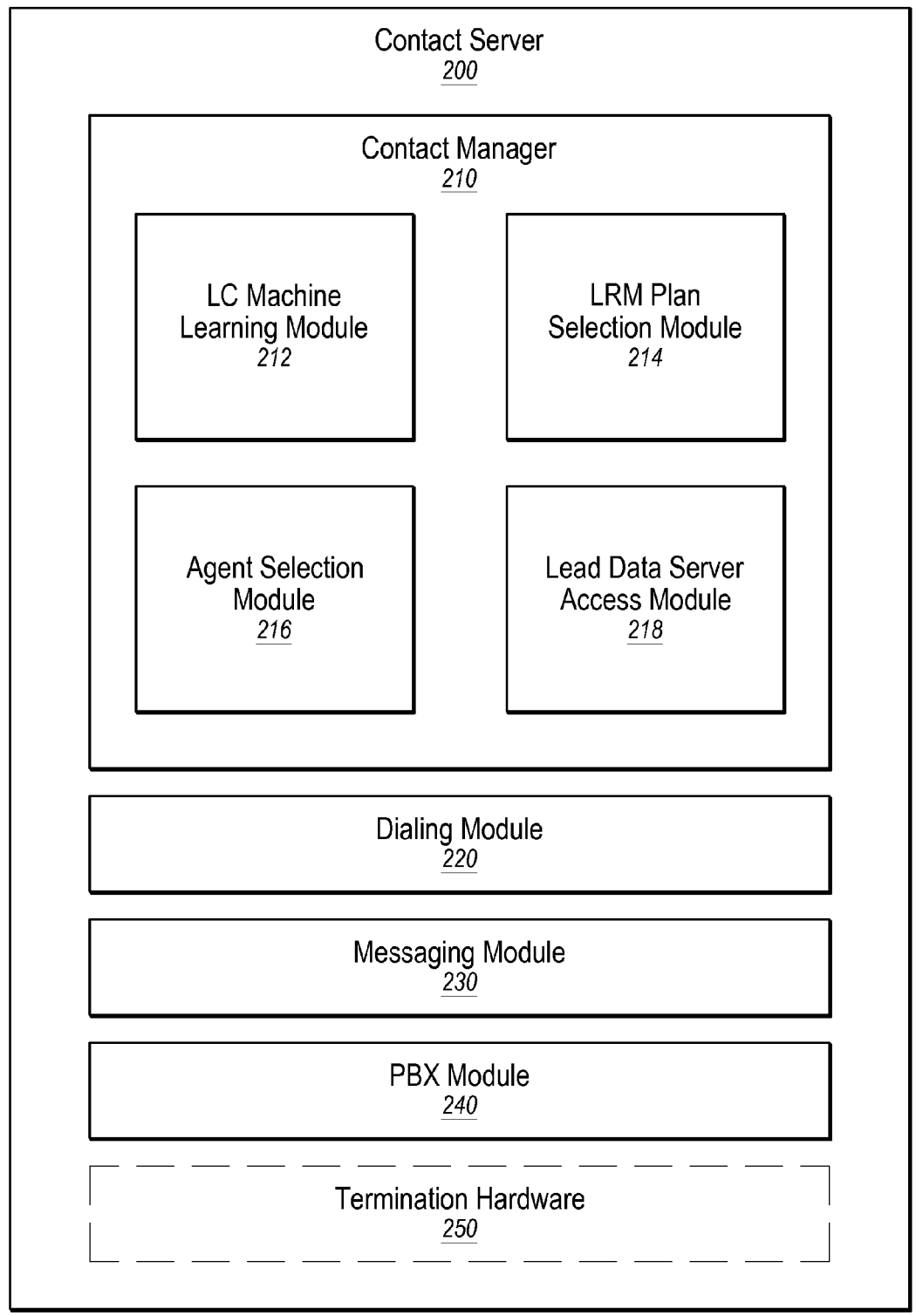
FIG. 2 is a schematic block diagram illustrating additional details of the example contact server of FIG. 1.

FIG. 2 is a schematic block diagram illustrating additional details of an example contact server 200 of FIG. 1. As disclosed in FIG. 2, the contact server 200 includes a contact manager 210, a dialing module 220, a messaging module 230, a PBX module 240 and termination hardware 250. In the depicted embodiment, the contact manager includes a Local Conditions (LC) Machine Learning Module 212, an LRM plan selection module 214, an agent selection module 216, and a lead and locality data server access module 218. Although shown within the contact server 200, the depicted modules may reside partially or wholly on other servers such as the web server 170 and the lead and locality data server 190 for example. The contact server 200 enables an agent to communicate with a lead in conjunction with an LRM plan.

The contact manager 210 may establish contact with users and agents and may manage contact sessions where needed. The contact manager 210 may initiate contact via the dialing module 220 and/or the messaging module 230.

The LC Machine Learning Module 212 may employ a local condition machine learning model to train one or more classifiers and then employ the trained classifier(s) to predict behavior using local conditions, according to the example methods disclosed herein. In at least some example embodiments, the LC Machine Learning Module 212 utilizes the lead and locality data server access module 208 to access and analyze lead information stored on the lead and locality data server 190 of FIG. 1. Once one or more response decisions are predicted for a particular lead, the one or more response decisions may be conveyed to the LRM plan selection module 214.

The LRM plan selection module 214 presents and/or selects one or more LRM plans for a particular lead and/or offering. Similarly, the agent selection module 216 selects an agent, class of agent, or agent skill set that is designated in each LRM plan.

The lead and locality data server access module 218 enables the contact manager 210 to access lead and locality information that is useful for contacting a lead. In one embodiment, the lead and locality data server access module 218 enables the contact manager 210 to access the lead and locality data server 190.

The dialing module 220 may establish telephone calls including VoIP telephone calls and PSTN calls. In one embodiment, the dialing module 220 may receive a unique call identifier, establishes a telephone call, and notifies the contact manager 210 that the call has been established. Various embodiments of the dialing module 220 may incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 may direct the PBX module 240 to perform the auxiliary functions.

The messaging module 230 may send and receive messages to agents and leads. To send and receive messages, the messaging module 230 may leverage one or more delivery or messaging services such as email services, instant messaging services, short message services, text message services, and enhanced messaging services.

The PBX module 240 may connect a private phone network to the PSTN 110. The contact manager 210 or the dialing module 220 may direct the PBX module 240 to connect a line on the private phone network with a number on the PSTN 110 or the internet 130. In some embodiments, the PBX module 240 may provide some of the auxiliary functions invoked by the dialing module 220.

The termination hardware 250 may route calls from a local network to the PSTN 110. In one embodiment, the termination hardware 250 interfaces to conventional phone terminals. In some embodiments and instances, the termination hardware 250 may provide some of the auxiliary functions invoked by the dialing module 220.

Having described a specific environment (an LRM system) and a specific application (LRM) with respect to FIGS. 1 and 2, it is understood that this specific environment and application is only one of countless environments and applications in which the example methods for using machine learning to predict behavior based on local conditions disclosed herein may be employed. The scope of these example methods is not intended to be limited to any particular environment or application.

Figure 3:
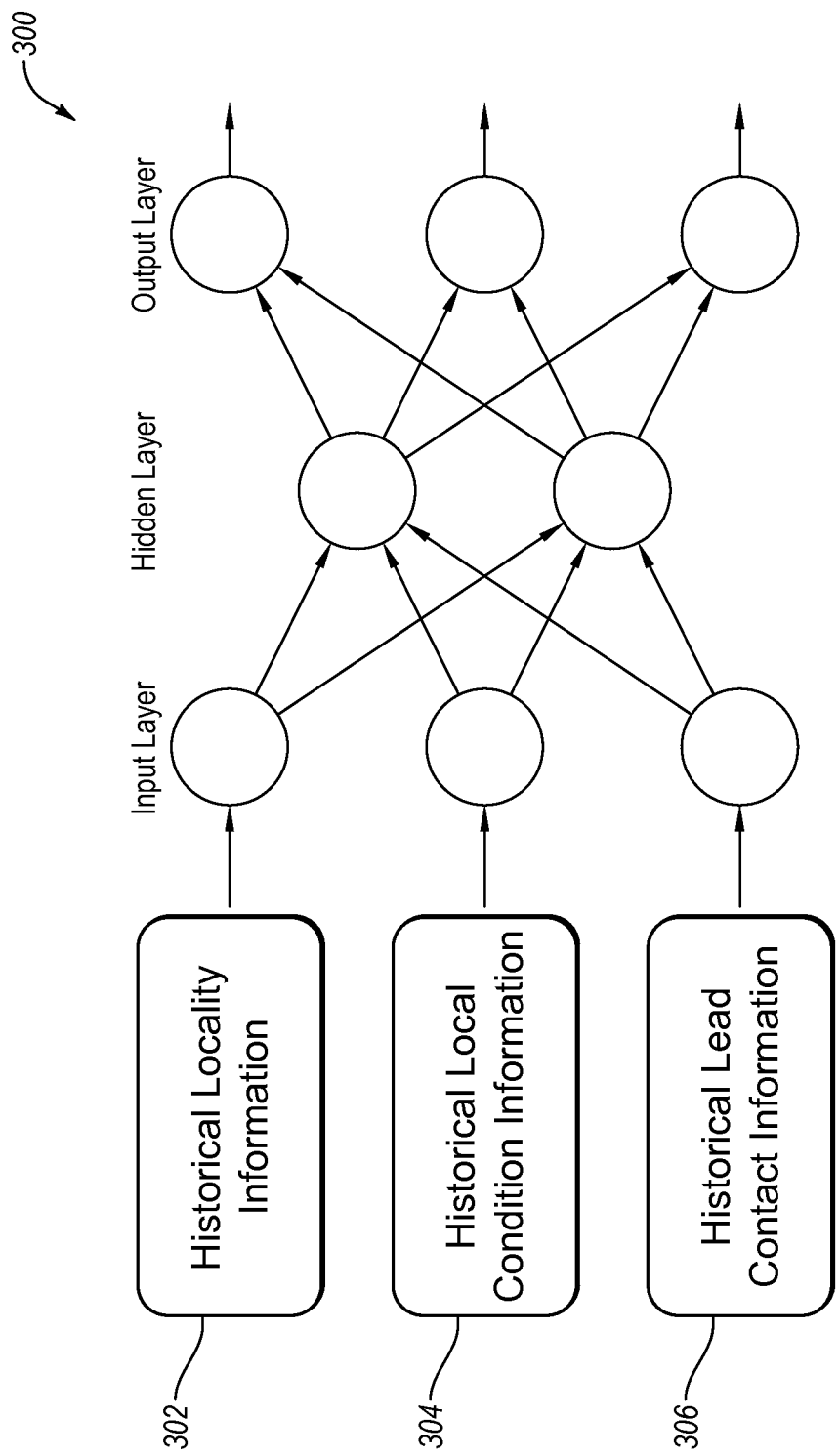
FIG. 3 is a schematic flowchart diagram illustrating example local information being employed in the training of an example multilayer perceptron (MLP) neural network classifier.

FIG. 3 is a schematic flowchart diagram illustrating example local information being employed in the training of an example multilayer perceptron (MLP) neural network classifier. As disclosed in FIG. 3, a classifier 300 is trained using historical locality information 302 for one or more localities, historical local condition information 304 for one or more localities, and historical lead contact information 306 for one or more localities. The historical information 302, 304, and 306 may be used to train the classifier 300 to predict likelihoods of leads exhibiting target behaviors.

For example, the historical locality information 302, the historical local condition information 304, and the historical lead contact information 306 may be employed to optimize a contact rate when a sales agent tries to contact a lead by phone. The likelihood that the lead picks up a phone may be influenced by geographical local conditions, such as weather condition, temperature, humidity, economic conditions, holidays, conventions, political events, or some combination thereof.

The historical information 302, 304, and 306 used as training data may be built from historical data collected over many years, such as ten years. For example, let S be a training set with n instances:

$$S=\{(x[1],y[1]),(x[2],y[2]), \ldots ,(x[i],y[i]), \ldots (x[n],y[n])\}(i=1,2, \ldots n),$$

where x[i] is an input feature vector and y[i] is a class label for instance[i]. For example, consider the case that the classifier 300 is trained for predicting contact rate. For a lead that a sales agent is trying to contact by phone, input feature x[i] may include general information about the lead (such as lead source, lead title, company size, etc.) as well as local data (such as hourly local weather data). For the task to make a recommendation on the best time of day to call the lead by phone, class label y[i] may include two parts: the time of day of phone call and the result of the call.

In one example embodiment, the classifier 300 may be trained on a training set S1 and tested on a test set S2. For example, the training set S1 may contain all data within an original six-month period and test data S2 contain all data within the next six-month period. Initially, a feature weight may be calculated for each potentially relevant input feature (of general and local data) in a training set. The feature weight may reflect the input feature's predictive value for a prediction task such as a contact rate prediction. For example, let input feature x have m components x=$(x_1, x_2, \ldots, x_m)$. For example, $x_1$="weather condition" and $x_2$="temperature." For each component j (j=1, ..., m), the algorithm may calculate a feature weight w(xj) based on training data.

Input feature may next be sorted by feature weight w(xj). An input feature may be considered relevant if its weight w(xj)>=Wthresh (where Wthresh is a threshold that is set empirically based on training data and prediction task). The classifier 300 may only use those relevant input features (with w(xj)>=Wthresh) as inputs and ignore other irrelevant input features (with w(xj)<Wthresh).

Predictions and decisions may then be made based on local conditions. For example, a learning task may be to make a recommendation on when is the best time (among different times of day from 8 am to 5 pm) for a sales agent to make a phone to a lead in order to optimize a contact rate. For example, the best time to call may be related to general input data (such as lead title or lead company size), interaction data (such as the time of day of previous dial attempts and results of those attempts), as well as local data (such as weather conditions during the day). The task may be to train the classifier 300 to make a recommendation as to the best time of day for the sales agent to call the lead.

A class label may then be set for the training data. For example, consider ten TOD (times of day) from 8 am to 5 pm. When a sales agent makes a phone call to contact a lead at 9 am, if the lead is contacted, the class label y may be set to y=(9,1); if the lead is not contacted, the class label y may be set to y=(9,0). In this case, the class label has two components, which is different from a typical machine learning task. For a typical machine learning task, the class label has only one component. For a typical classification problem, the goal of a machine learning task is to correctly classify the class of unseen inputs. For example, for a typical machine learning data set such as "iris," the goal is to correctly predict the type of iris based on input features. For this task, the class label has two components, namely: (<TOD>, <result-of-call>). This task can be represented in general as having class label (<action>, <quality-of-action>). For a user, the decision on which TOD to call is equivalent to making a decision on which of ten actions to take. The result of the action (contacted, not contacted, etc.) is the "quality-of-action" of the chosen action.

Although the classifier 300 is a multi-layer perceptron neural network used as a baseline machine learning model in FIG. 3, other machine learning models may also be used as baseline machine learning models in the example methods disclosed herein, including another multilayer neural network, a decision tree, or a support vector machine.

In one example application, the classifier 300 may be trained to make suggestions on which is the best time of day (TOD) for a sales agent to make a phone to contact a lead, given an input feature that contains general data and local data. In this example application, for simplicity, consider TOD within the range 8 am to 5 pm. In this case, there are ten possible TOD values. The classifier 300 may have ten output nodes representing ten TOD values.

The weights of the classifier 300 may be updated using a modified back-propagation algorithm during training that may have several differences compared to standard back-propagation. One difference may be that the back-propagation algorithm may only learn the weights related to the output node corresponding to the labeled class. For example, for a training instance where the TOD of a phone call is 9 am, the proposed method may use the training instance to only train the weights related to the output node for TOD=9 am, but not train the weights related to the other nine output nodes. In this example, the phone call at TOD=9 am may not necessarily be a positive example, depending on the result of the phone call. The other nine outputs (where TOD!=9 am) are not necessarily negative examples, also depending on the results of phone calls. In this case, when using the proposed method, the other nine outputs are not trained since they are not related to the training data (TOD=9 am). Only the output node for TOD=9 am is trained and its class label depends on the call result and can be set to either "1" (contacted) or "0" (not contacted). In contrast, in a typical machine learning classification training algorithm (such as standard back-propagation), the output node of the labeled class is trained using a positive label (such as "1") as target, while all other output nodes are trained using a negative label (such as "0") as target, and the weights of all output nodes are updated.

In another example embodiment, Instance Weighted Learning (IWL) may be employed to train the classifier 300, as discussed in U.S. Pat. No. 8,788,439, which is incorporated herein by reference in its entirety. Each of U.S. Pat. Nos. 8,812,417 and 8,352,389 is also expressly incorporated herein by reference in its entirety. An IWL-based learning algorithm may build a machine learning model that weights training instances based on a q value <quality-of-action>. In conventional training of a machine learning model, such as using back-propagation, weights of the training instances are updated in each iteration based on the formula: $\Delta w(i, j)=c \cdot \delta(j) \cdot x(i)$. In this formula, the amount of change $\Delta w(i, j)$ for weights w(i, j) at node j is proportional to the error $\delta(j)$ at the node j as well as input value x(i) from node i. The weights of the MLP neural network are also controlled by a learning rate c that controls the amount of change on the weights. With the above formula (based on a standard back-propagation), all training instances are weighted the same.

In contrast, IWL uses a quality weighting factor u(q) to weight training instances based on quality values q. One embodiment of IWL modifies the formula above as follows: $\Delta w(i, j)=u(q) \cdot c \cdot \delta(j) \cdot x(i)$. One example formula for the weighting factor u(q) is to use formula: $u(q)=(a+b \cdot q)$; where a reflects the weight of using a conventional weight update and b reflects the weight of the q value on the weight update. Thus if a training instance has a larger q value, u(q) will be larger and a classifier will learn more positively from the training instance.

In the example application for contact rate prediction, parameters may be set as follows: a=0, b=1.0. Quality value q may be set based on the result of calling. For example, if the sales agent has reached the correct contact, the set q=1.0. If the sales agent has contacted a gatekeeper (such as a secretary or receptionist) but has not contacted the correct lead, then set q=0.5. If the sales agent cannot contact the lead, then set q=0. Thus the classifier 300 may be trained to learn more from positive examples by modifying a learning rate based on a q value.

Hourly local weather data may be employed in the training of the classifier 300. In one example application, the classifier 300 may be trained to optimize a TOD recommendation based on hourly local weather data such as weather condition, temperature, and humidity. The following method may be employed to make a prediction and recommendation on each of the ten TOD (8 am to 5 pm) using the trained classifier 300. For example, consider TOD=8 am. The method may first build an input feature vector x(t=8), which includes both general data (such as lead source, lead title, company size, etc.) and local data (such as weather data). Local data may vary hour by hour and thus may have different impacts on contact rate at different hours. The method may next feed input feature vector x(t=8) into the trained classifier 300 for prediction. The predicted result may be a vector of predicted scores for the ten different TOD values:

$$\text{Score}(x(t=8))=[\text{Score}(8,8),\text{Score}(8,9),\ldots,\text{Score}(8,17)],$$

where $\text{Score}(t_1,t_2)$ represent the score for TOD=$t_2$ when feeding input feature vector $x(\text{TOD}=t_1)$. The method may then use Score(8,8) as the predicted score for input x(t=8). Similarly, for TOD=9 am, the method may build an input feature vector x(t=9) that includes general data and local data at t=9 am (which local data may be different from local data at t=8). The method may next feed input feature vector x(t=9) into the classifier 300 and receive result:

$$\text{Score}(x(t=9))=[\text{Score}(9,8),\text{Score}(9,9),\ldots,\text{Score}(9,17)].$$

The method may then use Score(9,9) as the predicted score for input feature vector x(t=9). The method may next repeat similar steps for t=10, . . . , 17. After running the method on the classifier 300 for the ten different TODs, the prediction scores for the ten TODs can be assembled using the above steps to get score:

$$\text{Score}=[\text{Score}(8,8),\text{Score}(9,9),\ldots,\text{Score}(17,17)].$$

The method may then choose the TOD with a maximum score as the best time of day to schedule the next call.

In another example application, a list of leads may be sorted every hour to include hourly local data for optimization. For example, consider a list of leads $(a_1,a_2,\ldots,a_n)$, where n=1000. The trained classifier 300 may be used to calculate scores for all n leads at t=8 am:

$$\text{Score}(t=8)=[\text{Score}(8,8)(a_1),\text{Score}(8,8)(a_2),\ldots\text{Score}(8,8)(a_n)].$$

Note that different leads in the list of leads $(a_1,a_2,\ldots,a_n)$, may be located in different locations and their local data (such as weather data) may be different. Thus, local data may have a different impact on the contact rate for the different leads. The lead list at t=8 am may then be sorted by score, with the highest score first. A sales agent may then first call leads with higher scores to increase the contact rate. For example, if a lead's local data at 8 am has a positive impact on contact rate, then the predicted score will be increased at 8 am for this lead, and a sales agent may increase the priority for this lead and call this lead at t=8 am. Thus, in this example application, hourly local data may help to increase the contact rate.

Figure 4:
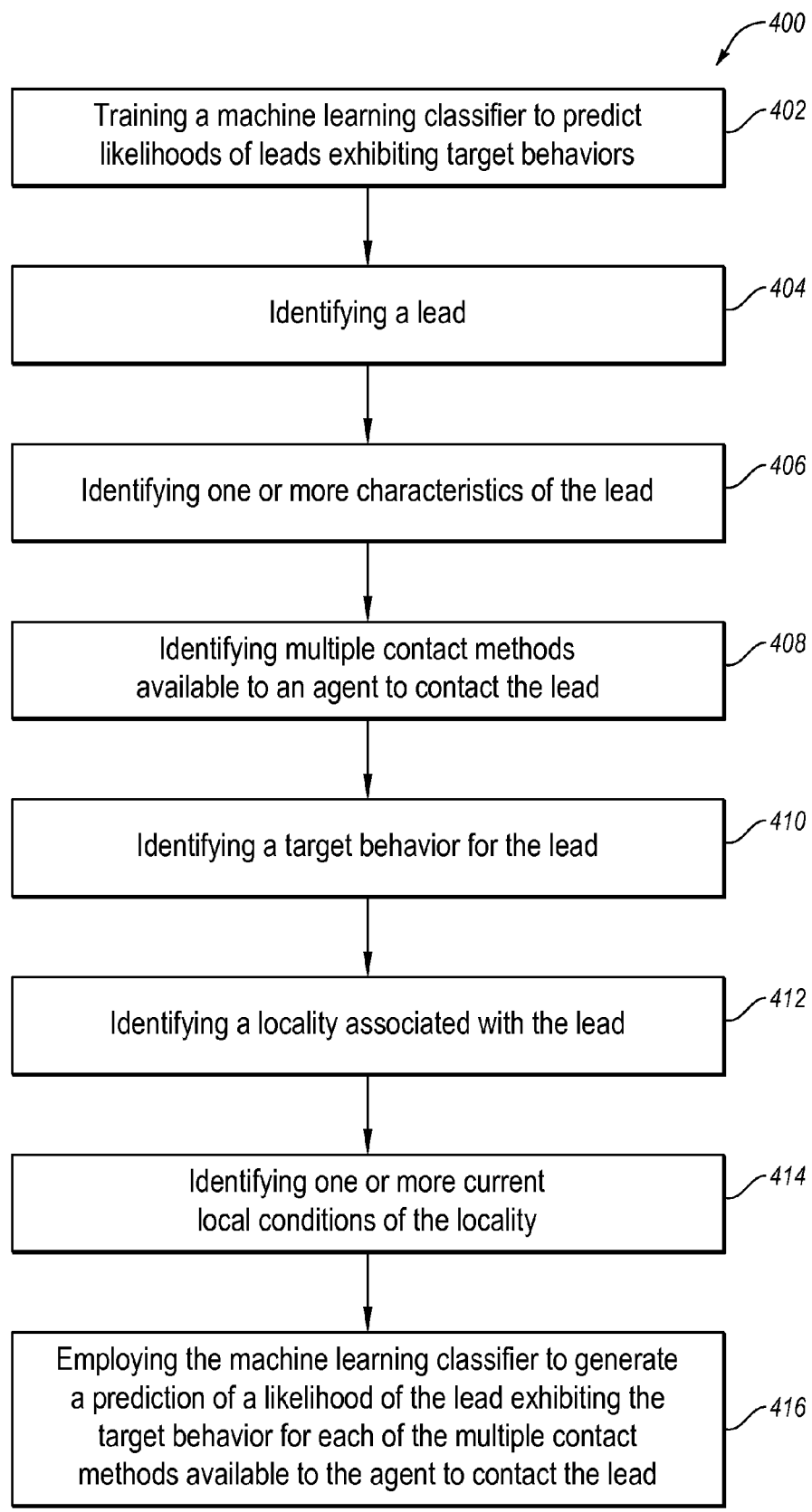
FIG. 4 is a schematic flowchart diagram of an example method for using machine learning to predict behavior based on local conditions.

FIG. 4 is a schematic flowchart diagram of an example method 400 for using machine learning to predict behavior based on local conditions. The method 400 may be implemented, in at least some embodiments, by the LC machine learning module 212 of the contact manager 210 of the contact server 210 of FIG. 1. For example, the LC machine learning module 212 may be configured to execute computer instructions to perform operations of employing an LC machine learning classifier to train the classifier 300 of FIG. 3 to predict behavior using local conditions, as represented by one or more of steps 402-414 of the method 400. Although illustrated as discrete steps, various steps may be divided into additional steps, combined into fewer steps, or eliminated, depending on the desired implementation. The method 400 will now be discussed with reference to FIGS. 1-4.

The method 400 may include step 402 in which a machine learning classifier is trained to predict likelihoods of leads exhibiting target behaviors. For example, the LC machine learning module 212 of FIG. 2 may train the classifier 300 of FIG. 3 to predict likelihoods of the leads, for which information is stored in the lead and locality data server 190 of FIG. 1, exhibiting target behaviors. This training of the classifier 300 may employ the historical locality information 302 for one or more localities, the historical local condition information 304 for the one or more localities, and the historical lead contact information 306 for the one or more localities, as disclosed in FIG. 3.

The method 400 may include step 404 in which a lead is identified. For example, the LC machine learning module 212 of FIG. 2 may identify a particular lead for which information is stored in the lead and locality data server 190 of FIG. 1.

The method 400 may include step 406 in which one or more characteristics of the lead are identified. For example, the LC machine learning module 212 of FIG. 2 may identify one or more characteristics of the lead that was identified at step 404. These one or more characteristics may be stored in the lead and locality data server 190 of FIG. 1.

The method 400 may include step 408 in which multiple contact methods available to an agent to contact the lead are identified. For example, the LC machine learning module 212 of FIG. 2 may identify multiple contact methods available to an agent to contact the lead that was identified at step 404.

The method 400 may include step 410 in which a target behavior for the lead is identified. For example, the LC machine learning module 212 of FIG. 2 may identify a target behavior for the lead that was identified at step 404. These target behaviors may include the lead responding to a contact attempted by the agent (such as a contact attempt via a phone call, an email, an SMS message, a fax, or a social network message, for example a Facebook® message or a LinkedIn® message), the lead accepting an appointment with the agent, the lead purchasing a product or service from the agent, or the lead donating money to the agent, or some combination thereof.

The method 400 may include step 412 in which a locality associated with the lead is identified. For example, the LC machine learning module 212 of FIG. 2 may identify a locality associated with the lead that was identified at step 404. This locality may be stored in the lead and locality data server 190 of FIG. 1. The locality may be, for example, a geographic locality associated with the lead (such as a geographic locality defined by a zip code's boundaries in which the lead resides) or a company associated with the lead (such the geographic location of the headquarters of the company which employs the lead).

The method 400 may include step 414 in which one or more current local conditions of the locality are identified. For example, the LC machine learning module 212 of FIG. 2 may identify one or more current local conditions of the locality that was identified at step 412. These one or more current local conditions of the locality may be stored in the lead and locality data server 190 of FIG. 1. For example, where the locality is a geographic locality, the current local condition may include current local weather in the geographic locality (such as whether it is currently raining, snowing, or sunny), lead name-based gender data for the geographic locality, astronomical data for the geographic locality, lunar data for the geographic locality, disaster data for the geographic locality, sporting event data for the geographic locality, political event data for the geographic locality, or holiday data for the geographic locality, or some combination thereof. In another example, where the locality is a company associated with the lead, the current local condition may include one or more of a venture capital status of the company, a stock price status of the company, a ranking of a website of the company, or economic data of the company, or some combination thereof.

The method 400 may include step 416 in which the machine learning classifier is employed to generate a prediction of a likelihood of the lead exhibiting the target behavior for each of the multiple contact methods available to the agent to contact the lead. For example, the LC machine learning module 212 of FIG. 2 may employ the classifier 300 of FIG. 3 to generate a prediction of a likelihood of the lead (that was identified at step 404) exhibiting the target behavior (that was identified at step 410) for each of the multiple contact methods (that were identified at step 408) available to the agent to contact the lead. The classifier 300 of FIG. 3 may base the predictions on the one or more characteristics of the lead (such as personal characteristics), the target behavior, the locality, the one or more current local conditions, or the multiple contact methods, or some combination thereof. The classifier 300 of FIG. 3 may base the predictions on one or more contact characteristics of the lead or on one or more agent impressions of the lead, or some combination thereof.

Therefore, the method 400 may be used to employ a machine learning classifier to predict behavior using local conditions. The example method 400 may be employed to identify a lead, a target behavior for the lead, a locality associated with the lead, and a current local condition of the locality. The example method 400 may then employ a machine learning classifier to generate a prediction of a likelihood of the lead exhibiting the target behavior based on the target behavior, the locality, and the current local condition. In this manner, the machine learning employed by the example method 400 can factor in local conditions in a locality associated with a lead in order to optimize a target behavior for the lead, such as the lead responding to a contact attempted by an agent, the lead accepting an appointment with the agent, the lead purchasing a product or service from the agent, or the lead donating money to the agent, or some combination thereof.

Having described the example method 400 of employing a machine learning classifier to predict behavior based on local conditions with respect to FIGS. 1-4, an example system and user interface that enables an agent to access and implement the resulting predictions will be described with respect to FIG. 5. It is understood that this specific system and user interface is only one of countless systems and user interfaces in which example embodiments may be employed. The scope of the example embodiments is not intended to be limited to any particular system or user interface.

Figure 5:
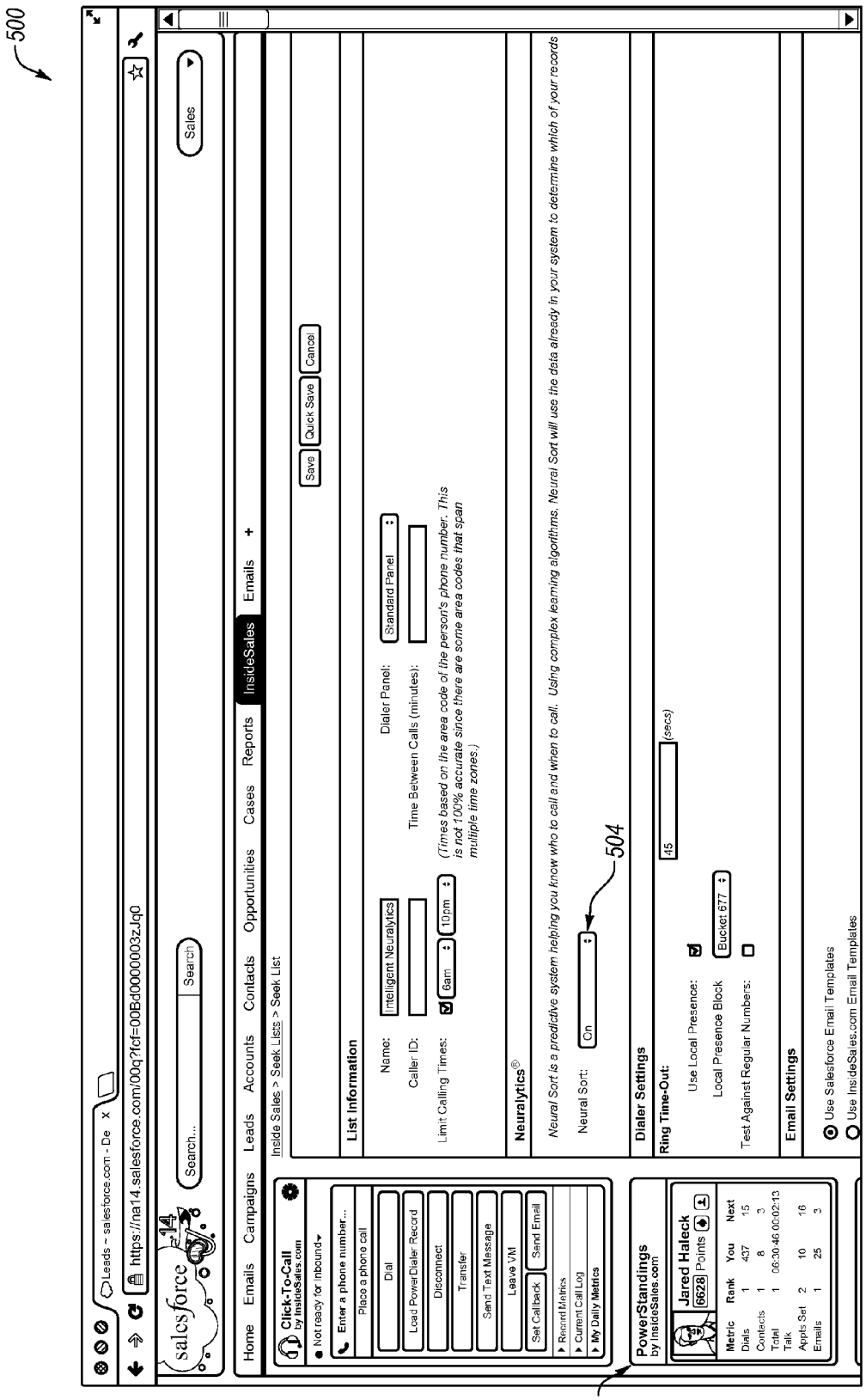
FIG. 5 illustrates an example computer screen image of a user interface of an example customer relationship management (CRM) system that employs the example method of FIG. 4.

FIG. 5 illustrates an example computer screen image user interface 500 of an example customer relationship management (CRM) system that employs the method 400 of FIG. 4. The user interface 500 includes various controls that allow an agent to manage customer relationships and, in particular, manage leads that are provided by the CRM system. The user interface 500 may be presented to an agent by the web server 170 on the workstations 128 or on the local agent workstations 192 of FIG. 1, for example. The agent may use the user interface 500 to respond to leads that have been previously stored on the lead and locality data server 190 of FIG. 1. In particular, the user interface 500 may allow the agent to respond to leads in a manner that optimizes a target behavior.

As disclosed in FIG. 5, the user interface 500 enables an agent 502 named "Jared Haleck" to manage a list of leads. The list may be sorted using a "Neuralytics®" system that is a predicative system that helps the agent 502 to know which lead to contact, as well as when and how to contact the lead. In particular, the user interface 500 also includes "Neuralytics®" options which allow the agent to select turn on the "Neural Sort" option 504. When the option 504 is selected, the method 400 disclosed herein may be employed to generate a prediction of a likelihood of the leads in the list exhibiting a target behavior based on the current local conditions of the localities associated with the leads in the list. The generated predictions can then be sorted in order to inform the agent 502 which lead to contact first in order to maximize the target behavior. For example, where the agent 502 using the user interface 500 is a sales agent, the target behavior may be the lead purchasing a product or service from the agent 502. Therefore, where the "Neural Sort" option 504 is set to "On," the method 400 disclosed herein may be employed to sort the list of leads by the likelihood of each lead purchasing a product or service from the agent 502 at a given moment based on current local conditions in the localities associated with the leads. For example, assuming that the system disclosed herein determines that leads are more likely to answer the phone and make purchases during a rain storm, the method 400 can rank higher in the list leads which reside in localities where it is currently raining, thus enabling the agent 502 to call a lead residing in a locality where it is currently raining, and thereby increase the likelihood that the lead will take the sales call of the agent 502 and make a purchase from the agent 502. In this manner, the agent 502 can maximize sales to the leads in the list.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically recited examples and conditions.

The invention claimed is:

1. A method for using machine learning to predict behavior based on local conditions, the method comprising:
   identifying a lead;
   identifying a target behavior for the lead;
   identifying a locality associated with the lead;
   identifying a current local condition of the locality; and
   employing a machine learning classifier to generate a prediction of a likelihood of the lead exhibiting the target behavior, the machine learning classifier basing the prediction on the target behavior, the locality, and the current local condition.

2. The method of claim 1, wherein the machine learning classifier further bases the prediction on one or more characteristics of the lead.

3. The method of claim 1, wherein:
   the locality is a geographic locality; and
   the current local condition includes current local weather in the geographic locality, sporting event data for the geographic locality, or political event data for the geographic locality, or some combination thereof.

4. The method of claim 1, wherein:
   the locality is a company associated with the lead; and
   the current local condition includes a size of the company.

5. The method of claim 1, wherein the target behavior for the lead includes the lead responding to a contact attempted by an agent.

6. The method of claim 1, wherein the machine learning classifier is a multilayer perceptron (MLP) neural network, another multilayer neural network, a decision tree, or a support vector machine.

7. One or more non-transitory computer-readable media storing one or more programs that are configured, when executed, to cause one or more processors to perform the method as recited in claim 1.

8. A method for using machine learning to predict behavior based on local conditions, the method comprising:
   training a machine learning classifier to predict likelihoods of leads exhibiting target behaviors, the training employing historical locality information of one or more localities, historical local condition information for the one or more localities, and historical lead contact information for the one or more localities;
   identifying a lead;
   identifying a target behavior for the lead;
   identifying a locality associated with the lead;
   identifying a current local condition of the locality; and
   employing the machine learning classifier to generate a prediction of a likelihood of the lead exhibiting the target behavior, the machine learning classifier basing the prediction on the target behavior, the locality, and the current local condition.

9. The method of claim 8, wherein the machine learning classifier further bases the prediction on one or more personal characteristics of the lead.

10. The method of claim 8, wherein the machine learning classifier further bases the prediction on one or more contact characteristics of the lead.

11. The method of claim 8, wherein:
    the locality is a geographic locality; and
    the current local condition includes current local weather in the geographic locality, sporting event data for the geographic locality, or political event data for the geographic locality, or some combination thereof.

12. The method of claim 8, wherein:
    the locality is a company associated with the lead; and
    the current local condition includes a size of the company.

13. The method of claim 8, wherein the target behavior for the lead includes the lead responding to a contact attempted by an agent.

14. The method of claim 8, wherein the machine learning classifier is a multilayer perceptron (MLP) neural network, another multilayer neural network, a decision tree, or a support vector machine.

15. One or more non-transitory computer-readable media storing one or more programs that are configured, when executed, to cause one or more processors to perform the method as recited in claim 8.

16. A method for using machine learning to predict behavior based on local conditions, the method comprising:
    training a machine learning classifier to predict likelihoods of leads exhibiting target behaviors, the machine learning classifier being a multilayer perceptron (MLP) neural network, another multilayer neural network, a decision tree, or a support vector machine, the training employing historical locality information of one or more localities, historical local condition information for the one or more localities, and historical lead contact information for the one or more localities;
    identifying a lead;
    identifying one or more characteristics of the lead;
    identifying multiple contact methods available to an agent to contact the lead;
    identifying a target behavior for the lead, the target behavior for the lead including the lead responding to a contact attempted by the agent;
    identifying a locality associated with the lead;
    identifying one or more current local conditions of the locality; and
    employing the machine learning classifier to generate a prediction of a likelihood of the lead exhibiting the target behavior for each of the multiple contact methods available to the agent to contact the lead, the machine learning classifier basing the predictions on the one or more characteristics of the lead, the target behavior, the locality, the one or more current local conditions, and the multiple contact methods.

17. The method of claim 16, wherein:
    the locality is a geographic locality; and
    the current local condition includes current local weather in the geographic locality, sporting event data for the geographic locality, or political event data for the geographic locality, or some combination thereof.

18. The method of claim 16, wherein:
    the locality is a company associated with the lead; and
    the current local condition includes a size of the company.

19. One or more non-transitory computer-readable media storing one or more programs that are configured, when executed, to cause one or more processors to perform the method as recited in claim 16.

* * * * *